Aug. 8, 1933.   H. D. CHURCH   1,921,660
MOTOR VEHICLE
Filed April 28, 1930   5 Sheets-Sheet 2

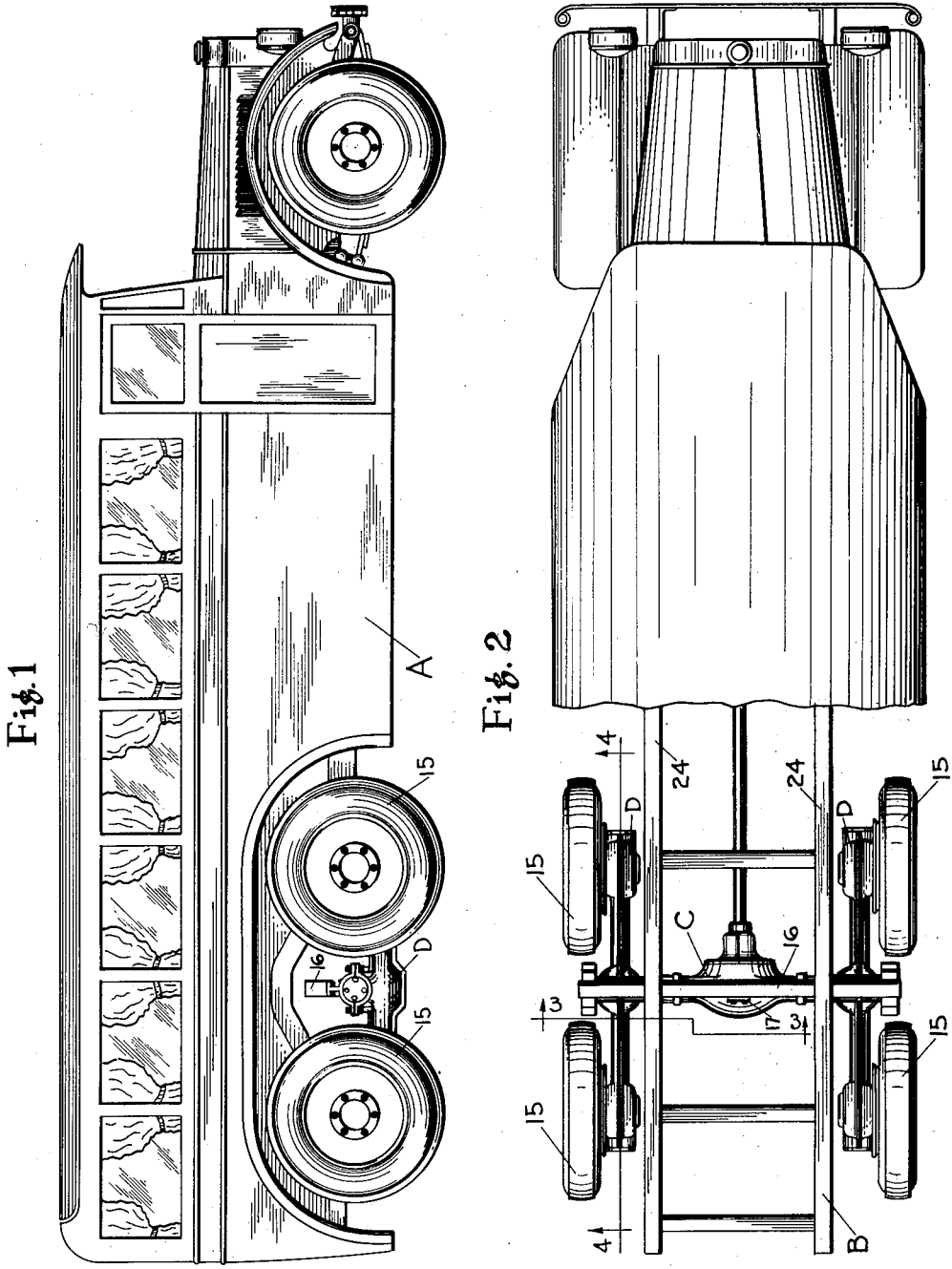

INVENTOR
HAROLD D. CHURCH
BY  RMCooper
ATTORNEY

Aug. 8, 1933.  H. D. CHURCH  1,921,660
MOTOR VEHICLE
Filed April 28, 1930   5 Sheets-Sheet 4

*INVENTOR*
HAROLD D. CHURCH
BY   RMCooper
*ATTORNEY*

Aug. 8, 1933.  H. D. CHURCH  1,921,660
MOTOR VEHICLE
Filed April 28, 1930    5 Sheets-Sheet 5

INVENTOR
HAROLD D. CHURCH
BY RMCooper
ATTORNEY

Patented Aug. 8, 1933

1,921,660

UNITED STATES PATENT OFFICE 1,921,660

MOTOR VEHICLE

Harold D. Church, Cleveland, Ohio, assignor to The White Motor Company, Cleveland, Ohio, a Corporation of Ohio Application April 28, 1930. Serial No. 448,079

8 Claims. (Cl. 180—22)

This invention relates to motor vehicles of the type which possesses multiple sets of traction wheels, and more particularly to that class of motor vehicles in which the sets of traction wheels are journalled on rigid, pivotally mounted carriers disposed at the sides of the vehicle.

It is an object of this invention to provide a power transmission mechanism for a vehicle of the class, above mentioned, which will permit differential movement between the traction wheels of the separate sets.

It is a further object of this invention to provide a power transmission mechanism for a vehicle of the class, above mentioned, which will permit differential movement both between the different sets of traction wheels and the wheels of the separate sets.

It is a further object of this invention to provide a sturdy and efficient axle, wheel, and power transmission for a vehicle of the class, above mentioned.

Other objects relating to details of construction and economies of manufacture will hereinafter appear.

In the accompanying drawings:

Figure 1 is a side elevation of a motor bus embodying this invention.

Figure 2 is a plan view of the bus shown in Figure 1, the rear portion of the body being broken away so as to show the rear axle and wheel assembly.

Figure 3:
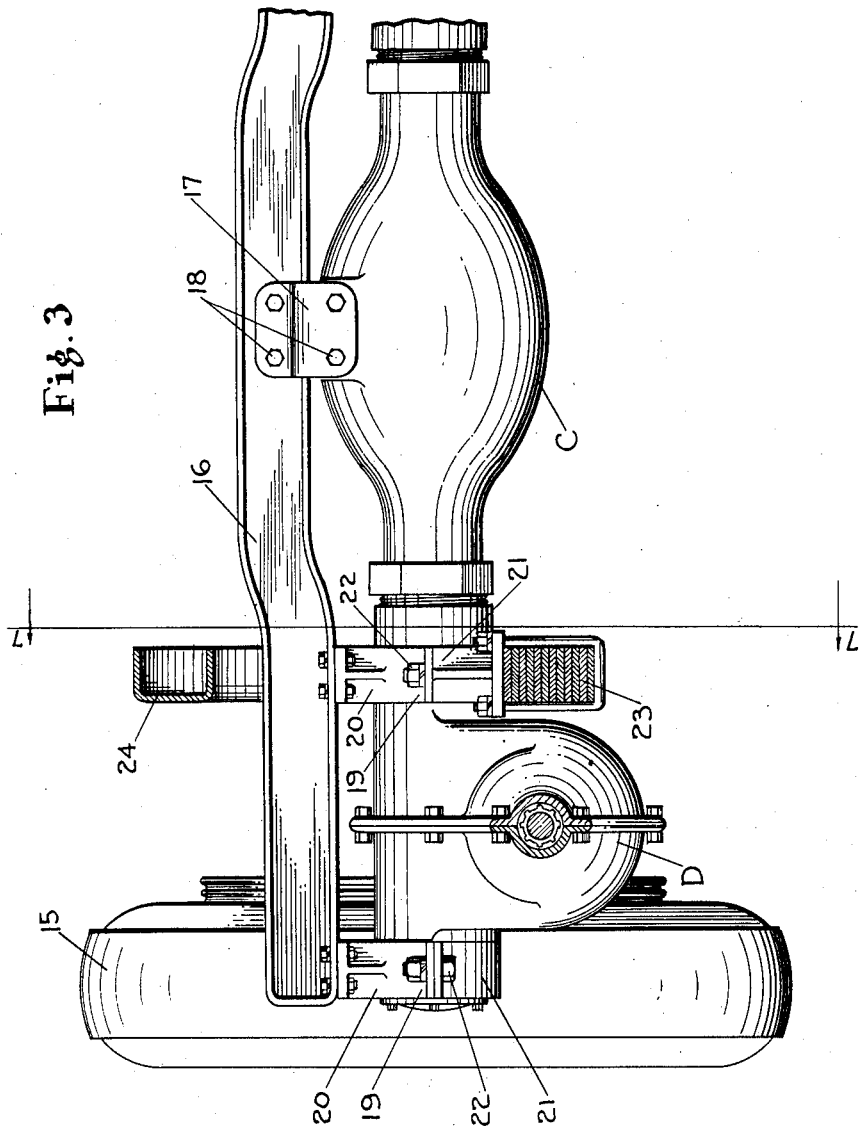
Figure 3 is a section taken on line 3—3 of Figure 2.
Figure 4:
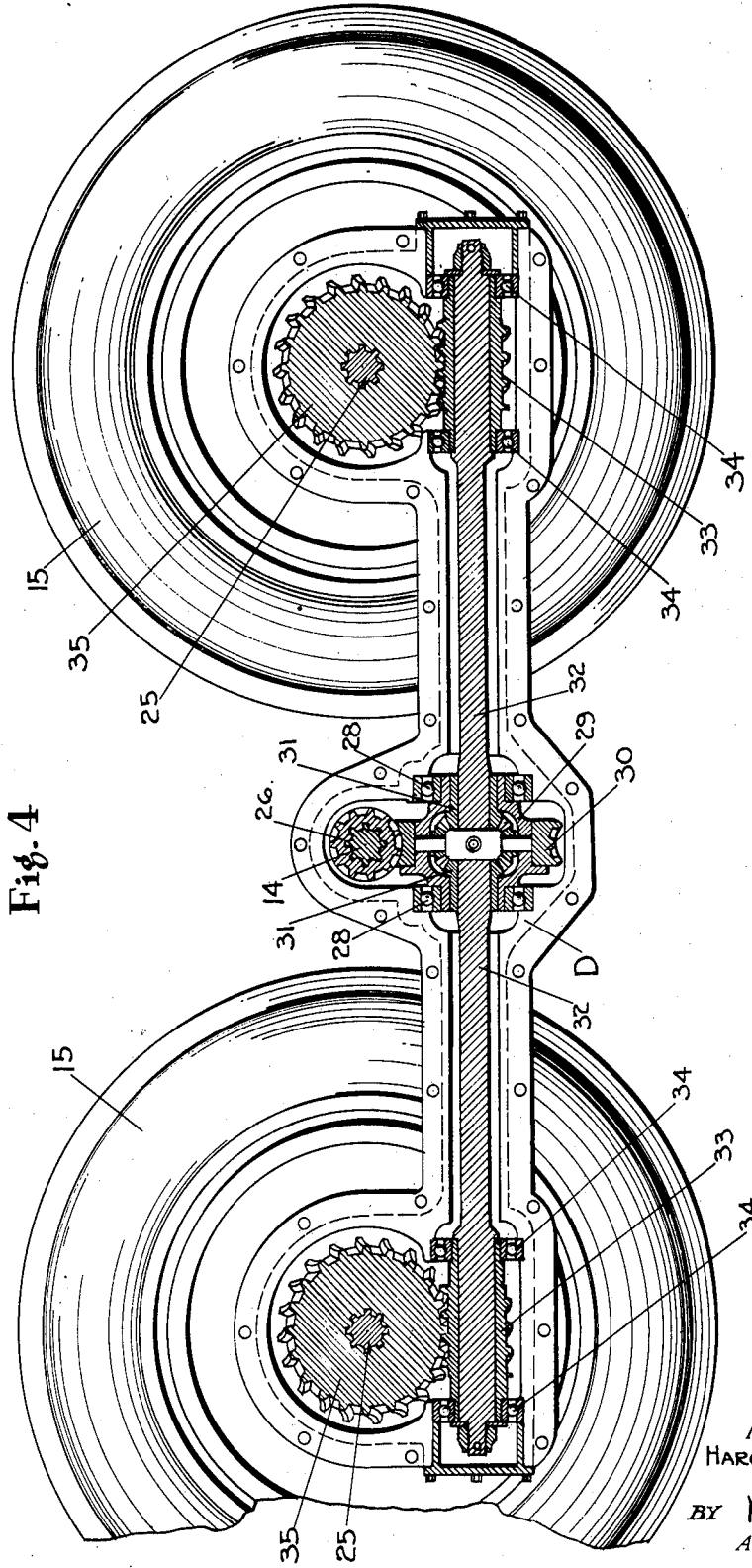
Figure 4 is a section taken on line 4—4 of Figure 2.
Figure 5:
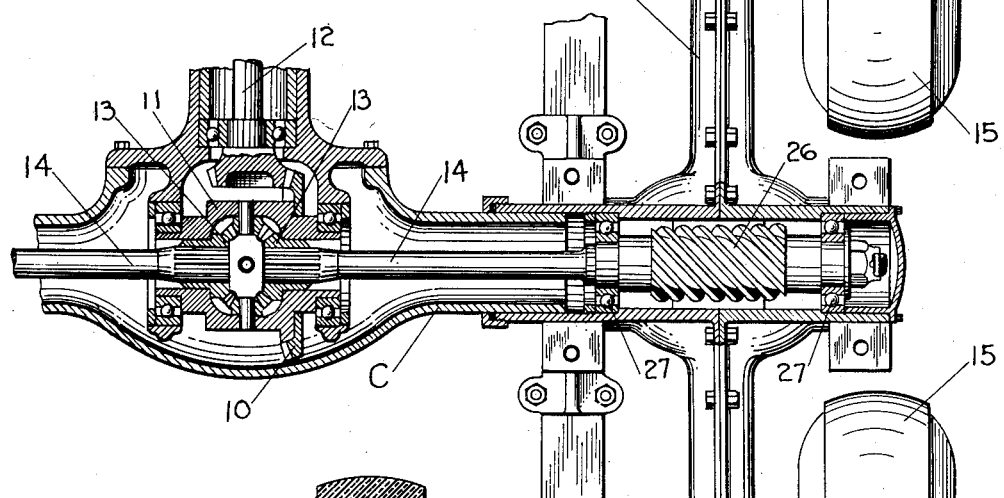
Figure 5 is a fragmentary horizontal medial section of the rear axle housing of the bus shown in Figure 1, the wheels and other associated parts at the right hand side of the vehicle being shown in conjunction with the housing.
Figure 6:
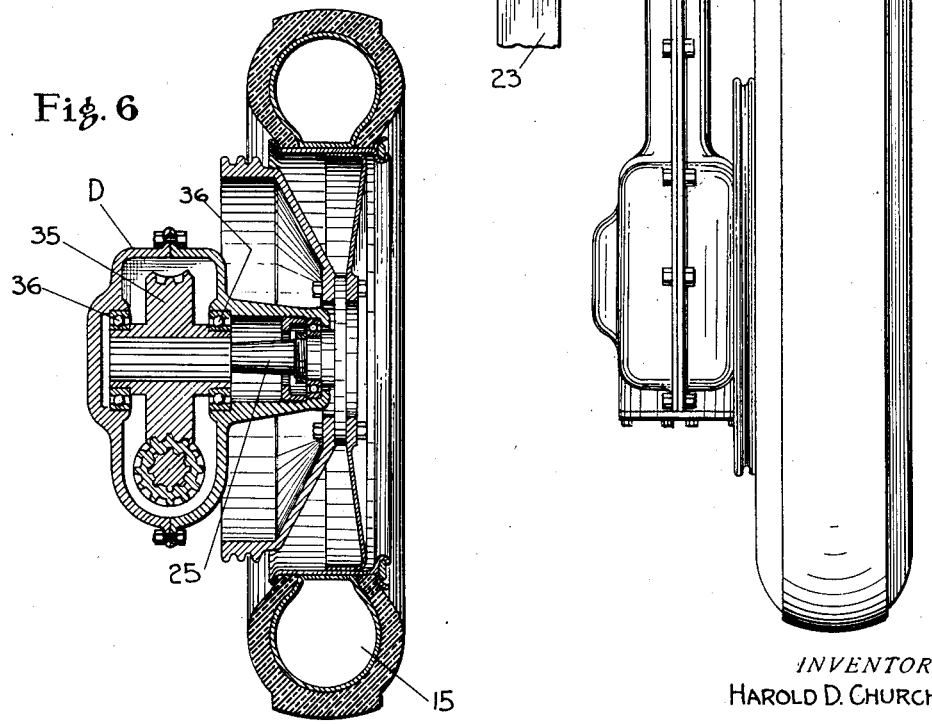
Figure 6 is a section taken on line 6—6 of Figure 5.
Figure 7:
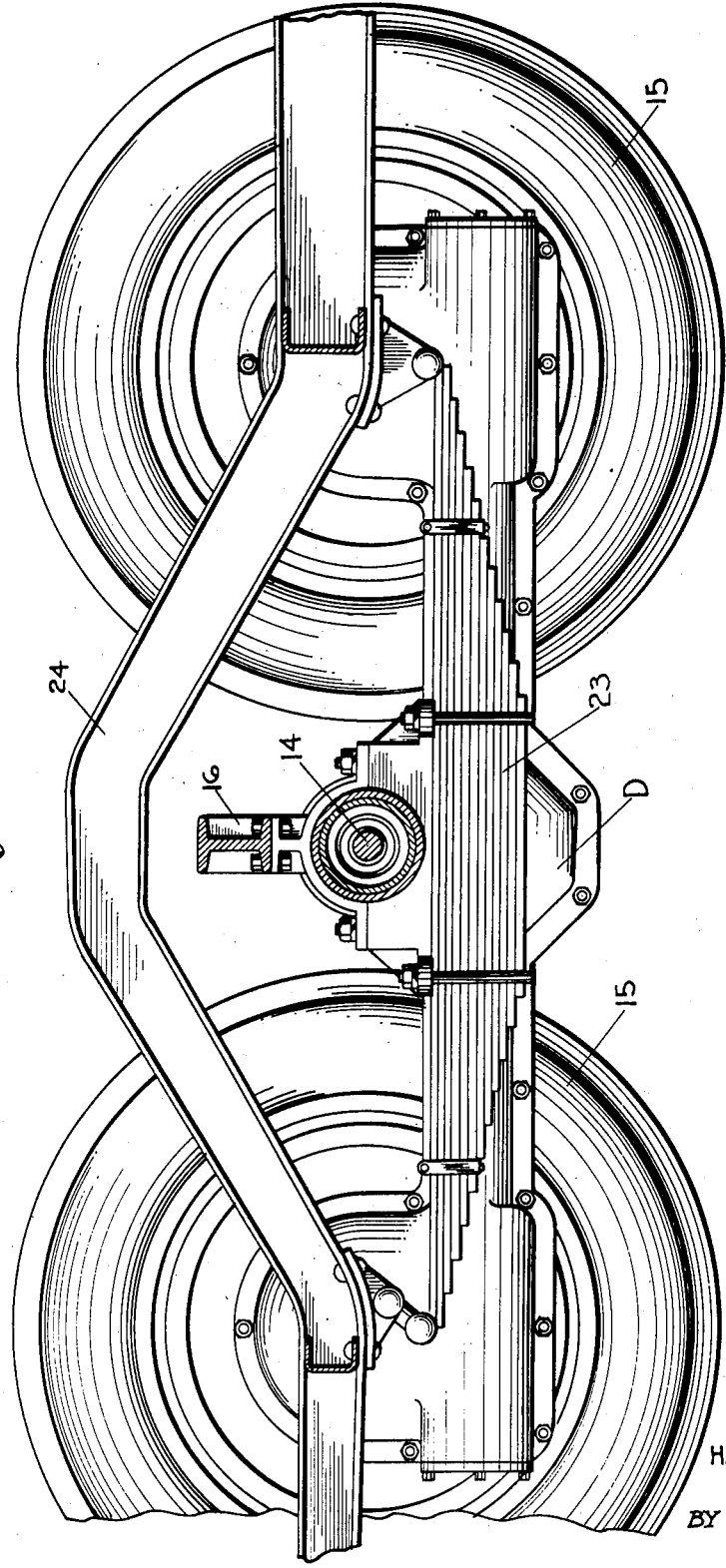
Figure 7 is a section taken on line 7—7 of Figure 3.

Referring to the drawings, the motor bus therein illustrated comprises generally a body A and a chassis B. Mounted on the forward end of the chassis, there is an internal combustion engine which drives the master gear 10 of a conventional differential 11 mounted in the rear axle housing C of the bus, the drive being effected through a conventional propeller shaft 12 and a series of mechanisms similar to those employed in a conventional four wheel automobile for the same purpose. The driven gears 13 of the differential 11, receive the inner splined ends of a pair of aligned transversely extending axles 14, the outer ends of which are connected by driving mechanism, hereinafter described, to the traction wheels 15 of the vehicle.

Extending transversely of the vehicle above the axle housing C there is a bar 16 held in fixed relation to the housing by a plate 17 secured to the bar and housing by means of screws 18; and mounted on each end of the housing there is a two-part longitudinally extending casing D supported in alignment with the housing by means of bearings formed in spaced brackets 19 carried by the bar 16. The brackets 19 each comprises an upper member 20 bolted to the bar 16 and a lower member 21 removably secured to the upper member by means of bolts 22, the above mentioned bearings consisting of complemental semi-circular recesses formed in the members 20 and 21.

The body A and the frame of the chassis are resiliently supported above the axle housing C and the associated bar 16 by means of springs 23 secured to the lower members 21 of the inner brackets 22 and to the frame side rails 24. The casings D are supported by the traction wheels 15 of the vehicle which are mounted on shafts 25 journalled in the ends of the casings D, and are adapted to oscillate in the above described bearings to maintain the traction wheels in engagement with the ground.

Secured upon the outer end of each axle 14 there is a worm 26 supported in the transverse tubular extensions of the associated casing by means of anti-friction bearings 27; and mounted in each of the casings D in anti-friction bearings 28 supported in the longitudinally extending portions of the casings, there is a conventional type differential 29, the ring gear or master gear 30 of which meshes with the superadjacent worm 26. The oppositely disposed driven gears 31 of the differentials 29 receive the inner splined ends of a pair of longitudinally aligned shafts 32. Mounted on the outer end of each of the shafts 32 there is a worm 33 supported in anti-friction bearings 34 mounted in the end of the associated casing. The worms 33 mesh with worm wheels 35 supported in the corresponding ends of the casings in anti-friction bearings 36. The worm wheels 35 are formed with splined bores which receive the inner splined ends of the traction wheel drive shafts 25.

From the description given it is believed that the operation will be apparent. Power is delivered from the propeller shaft 12 through the differential 11 to the axles 14, and from the axles 14 through the differentials 29 and the shafts 32 to the traction wheel drive shafts 25, differential action between the separate traction wheels being permitted by the differentials 29 and the intermediate differential 11.

Although the foregoing description is necessarily of a detailed character, in order that the invention may be completely set forth, it is to be understood that the specific terminology is not intended to be restrictive or confining, and that various rearrangements of parts and modifications of structural details may be resorted to without departing from the scope or spirit of the invention.

What I claim is:—

1. In a motor vehicle, the combination of a transverse member, longitudinally extending structures pivotally associated with the ends of said member, a shaft journalled in each end of each of said structures, a vehicle wheel and a worm wheel mounted on each of said shafts, a differential carried by said member, differentials having master gears in the form of worm wheels carried by said structures, means for driving the master gear of said first named differential, shafts connected to different driven gears of said first named differential and carrying worms meshing with the master gears of the differentials carried by said structures, and shafts connected to different driven gears of said last named differentials and carrying worms meshing with the worm wheels mounted on the shafts journalled in ends of said structures.

2. In a motor vehicle, the combination of a transverse axle housing, longitudinally extending structures pivotally associated with the ends of said axle housing, a transverse member rigidly connected to said housing, means carried by said member for supporting said structures in proper relation to said housing, a shaft journalled in each end of each of said structures, a vehicle wheel and a worm wheel mounted on each of said shafts, a differential mounted in said housing, differentials having master gears in the form of worm wheels mounted in said structures, means for driving the master gear of said first named differential, shafts connected to different driven gears of said first named differential and carrying worms meshing with the master gears of the differentials carried by said structures, and shafts connected to different driven gears of said last named differentials and carrying worms meshing with the worm wheels mounted on the shafts journalled in the ends of said structures.

3. In a motor vehicle, the combination of a transverse member, means for supporting one end of said member including a wheel, a longitudinally extending structure pivotally associated with and supporting the opposite end of said member, a pair of wheels journalled on said structure, a differential carried by said member, means for driving the master gear of said differential, means operatively connecting said first named wheel with a driven gear of said differential, an axle mounted in said member and connected to a second driven gear of said differential, a differential mounted in said structure in eccentric disposition to said axle and having a master gear in the form of a worm wheel, a worm mounted on said axle meshing with the master gear of said second named differential, and separate means operatively connecting the wheels journalled on said structure with the different driven gears of the differential mounted in said structure.

4. In a motor vehicle, the combination of a transverse axle housing, a rigid transverse construction disposed in spaced relation to said axle housing, longitudinally extending structures journalled on the ends of said axle housing and in said transverse construction, wheels journalled on said structures, axle shafts carried in said housing, means for driving said axle shafts, and means operatively connecting said axle shafts to certain of the wheels journalled on said structures.

5. In a motor vehicle, the combination of a transverse axle housing, a transverse construction disposed in spaced relation to said axle housing and secured in fixed relation thereto, longitudinally extending structures pivotally associated with the ends of said axle housing and journalled in said transverse construction, and wheels journalled on said structure, axle shafts carried in said housing, means for driving said axle shafts, and means operatively connecting said axle shafts to certain of the wheels journalled on said structures.

6. In a motor vehicle, the combination of a transverse axle housing, a transverse rigid construction adjacent said axle housing, longitudinally extending structures pivotally associated with the ends of said axle housing and pivotally mounted in said transverse construction, wheels journalled on said structures, axle shafts carried in said housing, means for driving said axle shafts, and means operatively connecting said axle shafts to certain of the wheels journalled on said structures.

7. In a motor vehicle, the combination of a transverse axle housing, a transverse rigid construction adjacent said axle housing, longitudinally extending structures pivotally associated with the ends of said axle housing and pivotally mounted in said transverse construction, wheels journalled on said structures, axle shafts carried in said housing, means for driving said axle shafts, means operatively connecting said axle shafts to certain of the wheels journalled on said structures, a vehicle frame, and means for supporting said vehicle frame from said transverse construction.

8. In a motor vehicle, the combination of a transverse axle housing, a transverse rigid construction rigidly connected to said housing, longitudinally extending structures located at the ends of said housing and journalled in said construction for oscillation with respect to said housing, wheels journalled on said structure, axle shafts carried in said housing, means for driving said axle shafts, and means operatively connecting said axle shafts to certain of the wheels journalled on said structure.

HAROLD D. CHURCH.